United States Patent
Pantsurkin et al.

(10) Patent No.: US 10,240,082 B2
(45) Date of Patent: Mar. 26, 2019

(54) METHOD FOR DESIGN OF PRODUCTION WELLS AND INJECTION WELLS

(71) Applicant: SCHLUMBERGER TECHNOLOGY CORPORATION, Sugar Land, TX (US)

(72) Inventors: Danil Sergeyevich Pantsurkin, Novosibirsk (RU); Geza Horvath Szabo, Edmonton (CA); Chad Kraemer, Katy, TX (US); Mohan Kanaka Raju Panga, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/318,740

(22) PCT Filed: Jun. 30, 2014

(86) PCT No.: PCT/RU2014/000473
§ 371 (c)(1),
(2) Date: Dec. 14, 2016

(87) PCT Pub. No.: WO2016/003303
PCT Pub. Date: Jan. 7, 2016

(65) Prior Publication Data
US 2017/0121593 A1    May 4, 2017

(51) Int. Cl.
*C09K 8/80*     (2006.01)
*E21B 43/267*   (2006.01)
(Continued)

(52) U.S. Cl.
CPC .............. *C09K 8/80* (2013.01); *C09K 8/62* (2013.01); *C09K 8/805* (2013.01); *E21B 43/26* (2013.01);
(Continued)

(58) Field of Classification Search
CPC .............. C09K 8/80; C09K 8/62; E21B 43/26
(Continued)

(56) References Cited

U.S. PATENT DOCUMENTS 3,066,118 A   11/1962  Jones
3,426,004 A    2/1969  Wagner
(Continued)

FOREIGN PATENT DOCUMENTS

RU   2312212 C1   12/2007
RU   2376455 C2   12/2009
(Continued)

OTHER PUBLICATIONS

Visawanathan et al., "Completion Evaluation of the Eagle Ford Formation with Heterogeneous Proppant Pacement", SPE 149390, 2011, 17 pages.
(Continued)

*Primary Examiner* — William D Hutton, Jr.
*Assistant Examiner* — Ashish K Varma

(57) ABSTRACT

The disclosure claimed herein relates to well systems for various fluids production, in particular, for production of fluids from hydrocarbon-containing formations using hydraulic fracturing process. According to the proposed method, injecting into well of fracturing fluid not containing proppant is performed to form a fracture in the formation, after which fracturing fluid is injected into the wellbore in pulse mode; the pulse mode provides at least one pulse of injecting fracturing fluid containing proppant, and at least one pulse of proppant-free fluid. Also, methods for fluid (Continued)

production and injection are proposed. Methods for fluids production, injection and recovery using hydraulic fracturing method are proposed. The proposed method increase the well lifetime due to reduced fluid flow impact on fracture walls and proppant clusters.

15 Claims, 3 Drawing Sheets

(51) Int. Cl.
*C09K 8/62* (2006.01)
*E21B 43/26* (2006.01)

(52) U.S. Cl.
CPC ........ *E21B 43/267* (2013.01); *C09K 2208/04* (2013.01); *C09K 2208/08* (2013.01); *C09K 2208/26* (2013.01)

(58) Field of Classification Search
USPC ...................................................... 166/280.2
See application file for complete search history.

(56) References Cited

U.S. PATENT DOCUMENTS

| | | | |
|---|---|---|---|
| 3,951,926 | A | 4/1976 | Hu |
| 6,776,235 | B1 | 8/2004 | England |
| 7,044,220 | B2 | 5/2006 | Nguyen et al. |
| 7,281,581 | B2 | 10/2007 | Nguyen et al. |
| 7,325,608 | B2 | 2/2008 | van Batenburg et al. |
| 7,581,590 | B2 | 9/2009 | Lesko et al. |
| 8,061,424 | B2 | 11/2011 | Willberg et al. |
| 8,066,068 | B2 | 11/2011 | Lesko et al. |
| 8,082,994 | B2 | 12/2011 | Nguyen et al. |
| 8,540,024 | B2 | 9/2013 | Kosarev et al. |
| 8,584,755 | B2 | 11/2013 | Willberg et al. |
| 8,960,293 | B2 | 2/2015 | Medvedev et al. |
| 2005/0244641 | A1 | 11/2005 | Vincent |
| 2008/0128131 | A1 | 6/2008 | Nguyen et al. |
| 2008/0135242 | A1* | 6/2008 | Lesko ................... C09K 8/665 166/268 |
| 2008/0149329 | A1* | 6/2008 | Cooper ................. E21B 43/267 166/250.01 |
| 2009/0044945 | A1 | 2/2009 | Willberg et al. |
| 2011/0036571 | A1 | 2/2011 | Vitalievich et al. |
| 2012/0125618 | A1 | 5/2012 | Willberg et al. |
| 2012/0247764 | A1 | 10/2012 | Panga et al. |
| 2015/0101808 | A1* | 4/2015 | Saini ....................... C09K 8/68 166/280.2 |

FOREIGN PATENT DOCUMENTS

| | | |
|---|---|---|
| RU | 2453694 C1 | 6/2012 |
| WO | 2001094744 A1 | 12/2001 |
| WO | 2004005671 A1 | 1/2004 |
| WO | 2007033489 A2 | 3/2007 |
| WO | 2007086771 A1 | 8/2007 |
| WO | 2009096805 A1 | 8/2009 |
| WO | 2011081546 A1 | 7/2011 |
| WO | 2014074440 A1 | 5/2014 |
| WO | 2015026545 A1 | 2/2015 |
| WO | 2016140591 A1 | 9/2016 |

OTHER PUBLICATIONS

Gyenes et al., "Synthesis and swelling properties of novel pH-sensitive poly(aspartic acid) gels", Acta Biomater, 2008, vol. 4, No. 3, pp. 733-744.
Horta et al., "The pH Inside a pH-Sensitive Gel Swollen in Aqueious Salt Solutions: Poly(N-vinylimidazole)", Macromolecules, 2009, vol. 42, No. 4, pp. 1285-1292.
Jiang et al., "Polyanion/gelatin complexes as pH-sensitive gels for controlled protein release", J. Appl. Polym. Sci., 2001, vol. 80, pp. 1416-1425.
Card et al., "A Novel Technology to Control Proppant Backproduction", SPE 31007, SPE Production & Facilities, Nov. 1995, pp. 271-276.
Kulkarni et al., "Mechanics of light weight proppants: A discrete approach", Composites Science and Technology, 72 (2012) 879-885.

* cited by examiner

METHOD FOR DESIGN OF PRODUCTION WELLS AND INJECTION WELLS

FIELD OF THE DISCLOSURE

The disclosure relates to the field of heterogeneous proppant placement (HPP) and represents a new approach to hydraulic fracturing of formation. Heterogeneous pack is formed by proppant (propping agent) when several individual clusters of proppant are placed in a fracture. This (heterogeneous) pack of individual clusters prevents the fracture from closing and at the same time, it forms a network of channels fully open for hydrocarbons flow.

The fracture conductivity is a parameter that affects well production rate or injectivity and for HPP fracture is determined by presence of channels. Conductivity of the HPP fracture is higher than that of conventional one until the flow paths for hydrocarbons (channels) remain open.

BACKGROUND

U.S. Pat. No. 6,776,235 "Hydraulic fracturing method", filed by Schlumberger on Jul. 23, 2002, discloses a method and means for optimizing fracture conductivity. The well productivity is increased by sequential injection into the wellbore of alternate stages of fracturing fluids having a contrast in their ability to transport proppants to fracture, or having a contrast in the amount of transported proppants, to improve proppant placement. The propped fractures obtained following this process have a pattern characterized by a series of proppant clusters spread along the fracture. In other words, solid particles clusters form "islands" that keep the fracture open along its length and provide a lot of channels for the formation fluids to circulate.

U.S. Pat. No. 7,281,581 "Methods of hydraulic fracturing and fractures propping in subterranean formations", filed by Halliburton on Dec. 1, 2004, discloses methods of heterogeneous proppant placement, which comprise forming a plurality of proppant aggregates, each proppant aggregate comprising a binding fluid and a filler, and introducing a plurality of proppant aggregates into at least one fracture.

U.S. Pat. No. 7,044,220 "Compositions and methods to improve proppant pack permeability and fracture conductivity in a subterranean well", filed by Halliburton on Jul. 27, 2003, discloses a hydraulic fracturing treatment with a proppant composition, comprising proppant filler solid particles and material capable of undergoing an irreversible degradation downhole; introducing the proppant composition to the fracture; and allowing the proppant composition to form a proppant matrix having voids in the fracture.

Patent application US 2008/0135242 "Heterogeneous proppant placement in a fracture with removable channelant filler", filed by Schlumberger on Dec. 8, 2006, (U.S. Pat. No. 7,581,590 (B2), U.S. Pat. No. 8,066,068 (B2)) discloses a method comprising injection, through a wellbore into fracture, of fracturing fluid comprising proppant and channel-forming filler, called a channelant, heterogeneous placement of proppant in the fracture in a plurality of proppant clusters or islands, spaced apart by the channelant, and removal of channelant filler to form open channels around the propping pillars for fluid flow from the formation through the fracture toward the wellbore.

Patent application US 2008/0128131 "Methods for enhancing fracture conductivity in subterranean formations", filed by Halliburton on Dec. 5, 2006, (U.S. Pat. No. 8,082,994 (B2)), discloses injection of a displacement fluid into a propped fracture in a subterranean formation and formation of at least one channel in the propped fracture.

Patent application WO 2007/086771 "Methods for hydraulic fracturing of subterranean formation", filed by Schlumberger on Dec. 5, 2006, (U.S. Pat. No. 8,061,424 (B2)), discloses economically effective methods for hydraulic fracturing of a subterranean formation that ensures improvement of hydraulic fracture conductivity because of forming strong proppant clusters uniformly placed in the fracture throughout its length. One of these methods comprises: a first step that involves injection into a wellbore of fracturing fluid containing thickeners to create a fracture in the formation; and a second step that involves periodic introduction of proppant into the injected fracturing fluid to supply the proppant into a created fracture, to form proppant clusters within the fracture to prevent fracture closure and channels for formation fluids to circulate between the clusters. Wherein the second step or its sub-steps involve additional introduction of either a reinforcing or consolidation material or both, thus increasing the strength of proppant clusters formed in the fracturing fluid.

The solutions known in the prior art are focused on the possibility for proppant (proppant) heterogeneous pack formation, while the increase of well lifetime due to lower impact of fracturing fluid on the fracture walls and proppant clusters (islands) is neglected.

Accordingly, in the prior art there is a gap in the creation of a mechanism of well lifetime increase by reducing the fluid impact on fracture walls and proppant clusters.

SUMMARY

The disclosure provides an approach of designing HPP treatment for production and injection wells. This approach is developed for horizontal and vertical wells; and utilizes fracture geometry and tail-in design for optimizing well production rate or injection capacity of well. Several approaches on tail-in proppant selection are also provided.

According to the disclosure claimed, a method is proposed for hydraulic fracturing of formation penetrated by a wellbore, where fracturing fluid without proppant (clean fluid) is injected into the wellbore for forming a fracture, the fracturing fluid is injected in the wellbore in pulse mode, with the injection pulse mode providing at least one pulse of injecting fracturing fluid with proppant (proppant-laden pulse) and at least one pulse of injecting fracturing fluid without proppant. During the pulse of injecting fluid with proppant, the reinforcing and/or consolidation material is also added to the fracturing fluid, and at least one of concentrations, either proppant concentration or reinforcing and/or consolidation material concentration is increased in the pulse of injecting proppant-laden fracturing fluid.

According to the disclosure claimed, a method is proposed for hydraulic fracturing of formation penetrated by a wellbore, where fracturing fluid without proppant is injected into the wellbore; as a fracture is made in the formation, fracturing fluid is injected in the wellbore in pulse mode, with the injection pulse mode providing at least one pulse of injecting fracturing fluid with proppant and at least one pulse of injecting fracturing fluid without proppant; the pulse mode provides a tail-in pulse of fracturing fluid with proppant, which is intended to increase the depth of the last portion of proppant placement in fracture.

According to the disclosure claimed, a method is also proposed for hydraulic fracturing of formation penetrated by a wellbore, where fracturing fluid without proppant is injected into the wellbore; as a fracture is made in the formation, fracturing fluid is injected in the wellbore in pulse mode, with the injection pulse mode providing at least one pulse of injecting fracturing fluid with proppant and at least one pulse of injecting fracturing fluid without proppant; the pulse mode provides implementation of operations aimed to reduce fracturing fluid viscosity.

The term "fluid" in the hydraulic fracturing method embodiments of the disclosure as described above understood as fracturing fluid.

According to the disclosure claimed, a method is also proposed for fluid production from formation penerated by a wellbore, where hydraulic fracturing is performed using one of the above methods of hydraulic fracturing, and where a channel for fluid production to the surface is provided, and the fluid is recovered from formation using this production channel.

The term "fluid" in the above method of the disclosure understood as oil, gas, water, or combinations thereof.

According to the disclosure claimed, a method is also proposed for fracturing fluid flowback from the stimulated formation after fracturing operation has been performed in accordance with one of the above methods of hydraulic fracturing, where a channel for fluid flowback to the surface is made, and the fracturing fluid is recovered from formation via this channel for fracturing fluid flow.

The term "fluid" in the above method of the disclosure understood as fracturing fluid.

According to the disclosure claimed, a method is also proposed for fluid injection into formation penerated by a wellbore, where formation hydraulic fracturing is performed in accordance with one of the above methods of hydraulic fracturing, and then the fluid is injected into the formation.

The term "fluid" in the above method of the disclosure understood as fluid injected into formation and representing water, steam, gas, drilling mud, liquid waste, or a combinations thereof.

BRIEF DESCRIPTION OF THE DRAWINGS

Below the embodiments of the disclosure are described in more detail in the drawings showing the following.

DETAILED DESCRIPTION

Figure 1:
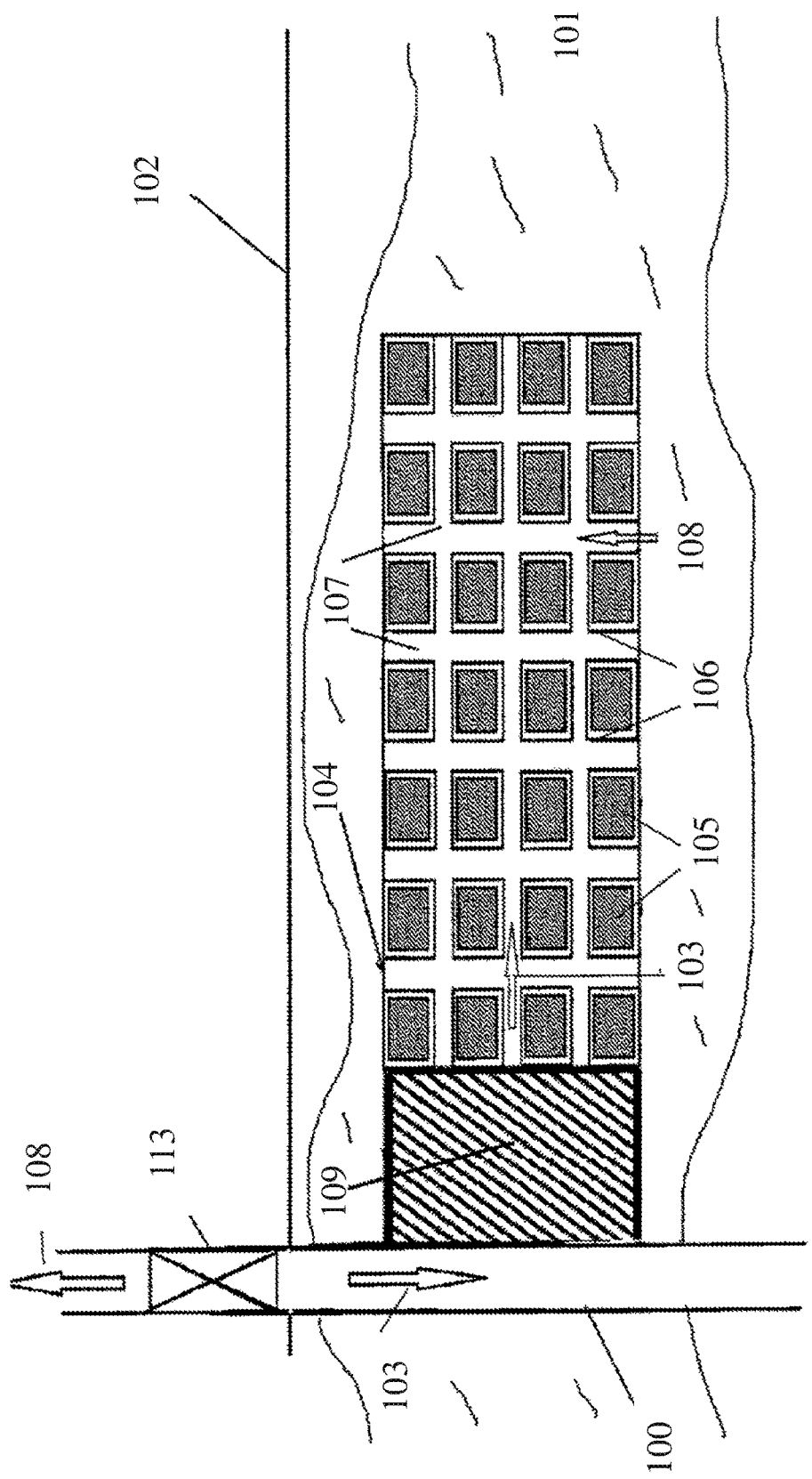
FIG. 1—variation of fracture surface covering with the proppant.

In accordance with the proposed methodology, FIG. 1 shows well 100 penetrating oil and gas bearing formation 101, where fracturing fluid 103 is injected from surface 102 and forms at least one fracture 104.

Fracturing fluid 103 is injected into well 100 in pulse mode to form a fracture, with the pulse mode providing at least one pulse of injecting fracturing fluid with proppant and at least one pulse of injecting fracturing fluid without proppant. Clean fracturing fluid or (fracturing fluid with additives which are not proppants) is understood as proppant-free fluid proppant.

By using the pulse mode of fracturing fluid injection, proppant clusters 105, 106 and channels 107 are formed in fracture 104; channels are used for fluid 108 production from formation 101 onto surface 102.

The main idea of the approach disclosed below is to increase the well lifetime by reducing the fluid impact on fracture walls and on proppant clusters (islands). Also, on the one part, to reduce the pressure drop in the fracture while keeping the volumetric velocity of the fluid (here and further in the text the "fluid" is supposed to be injected/forced, flowback fracturing fluid or produced fluid). On the other hand, the pressure drop can be kept at the same level, while the fluid flow rate is increased. This pressure drop can be either induced (i.e., during hydraulic fracturing operation) or natural.

It is well known that the main determinants of pressure drop are fluid linear velocity and its viscosity: the higher velocity or viscosity of fluid will cause a higher pressure drop:

$$\Delta\rho = f(\mu, V) \quad \text{(Equation 1)}$$

Here $\mu$ is the fluid viscosity and V is the fluid average velocity. Viscosity is a given property of the fluid and can be easily measured. The average fluid velocity is a function of several parameters and can be estimated.

Below there is a list of common methods for increasing the well operation lifetime both at the phase of fracturing fluid injection and at the phase of fluid production from the formation, or recovery of fluid injected into the well during hydraulic fracturing process.

Reducing Fluid Viscosity

While altering production fluid viscosity seems hard to accomplish, the changing of injected or flowback fluid viscosities is feasible. Non-limiting examples are:

a) when polymer-based (e.g. gelled) fluid is used as fluid, the polymer concentration is varied in the fracturing fluid; in particular, polymer concentration is reduced to 0.1-3.0 g/l of fracturing fluid, e.g., to the range 1-2.5 g/l; and b) increasing the efficiency of gel breaker.

The efficiency of gel breaker in the frac fluid is achieved by the several methods: by increasing the breaker concentration, e.g. using a higher concentration of incapsulated breaker will not affect the fracturing fluid properties during injection stage; however, it will reduce the fluid viscosity after the proppant has been placed into tehb fracture and the breaker capsules are broken;

c) using non-polymer fluids with a low viscosity; and d) delay of production stage in order to increase the temperature of fluid injected into the well; the delay should last at least 24 hours, e.g. 24-72 hours.

The gel breaker (viscosity reducing agent) becomes more efficient as the temperature is raised; more chemically active breakers can be used, e.g. persulfate breakers are used instead of organic peroxides or enzymes.

e) adding friction reducing agents, in particular, changing their concentration; and f) increasing the temperature of injected fluid at the surface up to 20-100° C.

Fracture Width Increase

Figure 2:
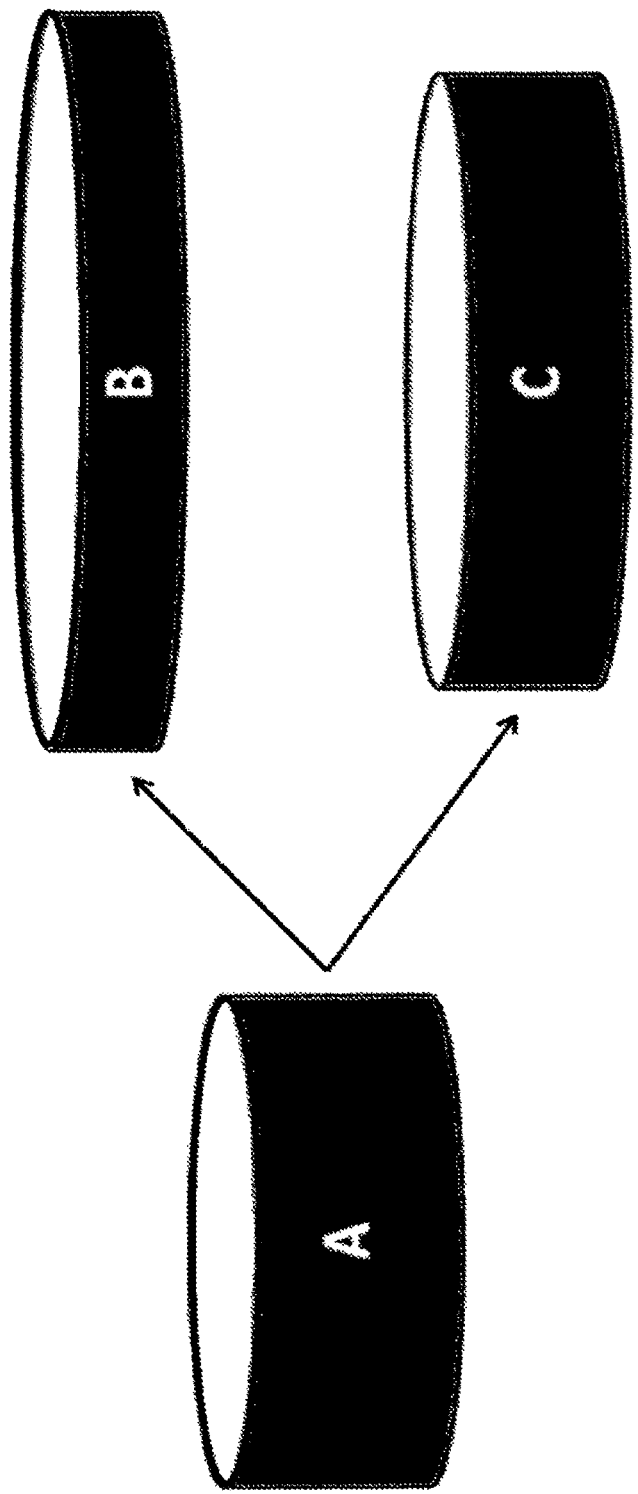
FIG. 2—proppant cluster compression and proliferation.

Non-limiting examples of fracture width growth are:

a) increasing the thickness of proppant cluster, which can be achieved by increasing the proppant concentration in the injection impulses, both in the pulse of injecting fracturing fluid with proppant, and in the pulse of injecting fracturing fluid without proppant. In particular, the claimed method works for the proppant concentration up to 200-1,800 g/lr in fracturing fluid.

b) FIG. 2 shows the disclosure embodiment which envisigates for increasing the concentration of reinforcing and/or consolidation material, e.g. organic or inorganic fibers or combinations thereof, to prevent the proppant clusters from spreading under the closure stress; it is possible to induce the increase of proppant cluster thickness (this may also result in lower coefficient of fracture coverage with the proppant). Within the framework of the disclosure, the increase in reinforcing and/or consolidation material concentration is possible in the fracturing fluid in the pulse containing proppant in the amount of 5 to 500 g/l of fracturing fluid. Fibers from metal, glass, carbon, and polymers can be used.

In FIG. 2, compression and spreading of proppant cluster is shown, where A is the initial cluster with no pressure applied; B is an additive-free cluster under pressure of fracture closure; and C is a cluster with admixed fibers under pressure. In order to achieve less spreading (case C), deformable particles, resin coated proppant, etc. are used as well.

However, degradation of fibers has to be taken into account, because as soon as fibers degrade, the proppant cluster will continue spreading, and the benefit of using fibers will be lost. In another embodiment, application of non-degradable fibers is possible. Depending on the conditions (temperature, medium), various fibers can be deemed as non-degradable, such as: nylon, metal fibers, polyurethane fibers, glass fiber, carbon fiber, or combinations thereof.

Reducing the coefficient of fracture coverage with proppant. Coefficient of fracture coverage with proppant Ap is determined as the ratio of proppant-covered fracture area to the total fracture area. As shown in FIG. 1, due to reduced coefficient of fracture coverage with proppant from Ap1 (106) to Ap2 (105), the cross-section of channels 107 increases and, consequently, the fluid velocity in the channels declines, while the fluid flow rate being constant.

Non-limiting examples of this parameter change are:

a) Changing the ratio of duration (pulse time) of pulses of proppant-laden fracturing fluid, to pulses of proppant-free fracturing fluid. In applications, the ratio of injecting pulse with proppant-laden fracturing fluid to proppant-free fluid is from 1:1.2 to 1:5.

b) Increasing the fiber concentration or a deformable filler, which prevents clusters from spreading (FIG. 2) and results in a smaller area occupied by clusters in the fracture; i.e., area of cluster 106 is greater than area of cluster 105, while cross-section of channel 107 is increased, with the occupied area reducing (this may also result in the increase of proppant cluster thickness). In applications, the concentration of deformable filler is increased in the proppant-laden pulse by the amount from 0.1 to 50 w. %. Similarly, the increase in fibers concentration in the proppant-free pulse is also possible.

Depending on the conditions (closure pressure), resin or plastic particles, metal granules, nutshell, soft minerals such as talc, or combinations thereof can be used, without limitation, as deformable filler. Also, deformable filler can be in the form of spherical particles, or non-symmetric particles with dimensions ratio from 1:1.1 to 1:10, or minimum linear dimension of the deformable filler particles can be 20 μm and more, e.g. 100-1,000 μm.

c) Using proppants with coating, such as resin coated proppant, prevents clusters from spreading (FIG. 2), which results in a smaller area occupied by clusters in the fracture (this may also result in the increase of proppant cluster thickness). Resins, rubbers, polymer coating, metal coating or ceramic and glass coating are used for proppant.

Figure 3:
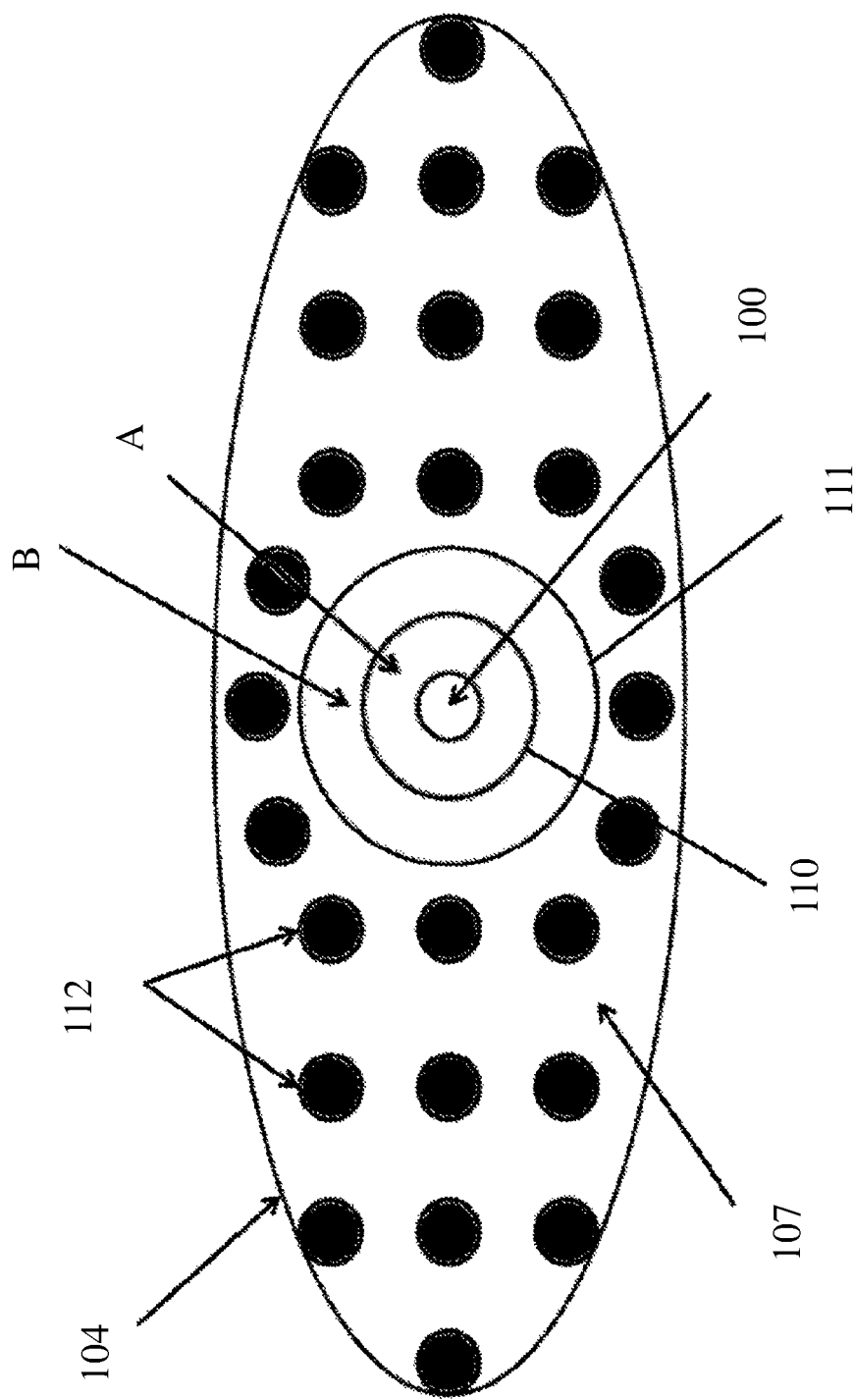
FIG. 3—variation of depth for tail-in placement.

In FIG. 3, a variant of embodiment is shown, which provides deeper placement of the tail-in portion of proppant in a horizontal well. When fracturing fluid 103 is injected into well 100, fracture 104 is formed; then fracturing fluid is injected in pulse mode to form clusters (islands) 112 of proppant in the fracture, with channels 107 forming between them.

Increasing the depth of proppant tail-in portion placement from A to B results in larger area of this proppant portion contact with the remaining fracture (from line 110 to line 111). At constant fluid flow rate, the linear velocity of fluid flowing through one unit of the boundary surface will be smaller in case of line 111.

The following approaches are non-limiting examples of changing of proppant tail-in portion placement depth:

a) increasing the length of pulse of proppant tail-in portion 109 injection. In other words, during the tail-in phase of hydraulic fracturing, additional amount of proppant, from 5,000 to 50,000 liters, can be injected (keeping its constant concentration in the fluid is desirable, but and possible to change its concentration in fracturing fluid, e.g. it is possible to increase the proppant concentration up to 200-1,800 g/l during the tail-in pulse of injecting fracturing fluid with proppant);

b) injection of displacement fluid. While keeping the quantity and concentration of proppant unchanged during the tail-in phase of hydraulic fracturing, a possibility to push the proppant further into the fracture is provided by injecting a portion of fracturing fluid with proppant. The volume of displacement fluid pumped after tail-in stage is in the range from 1,000 to 30,000 l. However this approach can create pinch point in near wellbore zone.

Selection of proppant for tail-in phase of hydraulic fracturing should be specially taken into account, because in tail-in phase the proppant creates an obstacle for a fluid flow and its permeability can affect the pressure drop. To minimize the pressure drop effect, the following approach is used:

a) first of all, high-quality ceramic proppants are used for tail-in stage, such as commercially available high-strength proppants (herein, HSP—high-strength proppant, ISP—intermediate strength proppant, and LWP—light-weight proppant).

b) proppant strong enough to withstand the closure pressure without crushing is used.

c) the size of proppant granules for the tail-in phase of hydraulic fracturing is selected to minimize the damage the proppant pack conductivity, caused by fines of proppant or rock carried into the wellbore during production or flow back. Depending on the grain-size distribution of carried particles, proppant granules should be properly selected for the tail-in phase of hydraulic fracturing. The proppant fines flowback are proppant particles injected into the fracture and crushed due to the high closure pressure.

Moreover, the origin of fines flowback can be different: this can be a product of proppant crush, proppant-rock interaction or other particles produced during the fracture liftime due to natural rock erosion processes.

The size of proppant granules for tail-in stage is selected so that fine particles size (resulst of propapnt or rock regradation) meet the criterion: $D > 14 \cdot d$, where D and d are the $50^{th}$ percentile of tail-in proppant granule size and the size of fine particles, respectively, i.e. 50% of particles have a size less than D (or d), and other particles—no less than 50%.

An alternative and addition to the above approaches is the use of proppant with the maximum size of particles that can be injected into a particular well using particular equipment; such proppant can be injected into a particular well/fracture to provide an increase of pores forming in the pack of the tail-in proppant after the fracture closure and available during the hydraulic fracturing tail-in phase. This will ensure maximum probability of fine particles passage through the tail-in pack and, consequently, minimize the risk of plugging for this pack.

It is recommended to choose a proppant with the largest grain size (for example, 6/10 mesh size (here we use US Mesh scale of particles size measurement), or 8/14 mesh). In this particular case, particles with the largest size are particles with maximum size that can be injected into a well using the equipment available. For example, if the maximum size of particles that can be injected in this case is 3 mm, the particles with a size of 3 mm or 2.5 mm should be used. In particular, particles with grain size from 0.4 to 8 mm, or 0.8-3.5 mm, or 1.2-2.4 mm, or 1.4-1.6 mm, or 1.50±0.01 mm can be used.

The efficiency of proppant is more evident in case of narrow grain size distribution (e.g. agent with particle size 8/10 is more efficient than agent with particle size 8/14).

Narrow distribution means distribution where the particles are most close (homogenous) in terms of size. Therefore, particles with distribution 8/10 are more appropriate that those with distribution 8/14. In the distribution 8/10 the size of pores in the proppant pack is larger than in pack with distribution 8/14 because, firstly, the particles are larger in 8/10 and, secondly, they are more homogenous in terms of size. Thus, pack of particles with distribution 8/10 is more efficient for carried particles passage, than pack with distribution 8/14. In this embodiment, sizes 8/10 and 8/14 are given as an example. The narrowest range of distribution shows the difference between the largest and the smallest grains of proppant being maximum 50%, or maximum 25%, or maximum 10%.

In the proposed disclosure, proppant particles are selected with asymmetric ratio of width to thickness (or length), in particular, at least 1:2 (that is, the . rod-shaped proppant);

Within the tail-in stage of hydraulic fracturing, channels formation in the proppant pack is provided (using HPP or otherwise). Such channels formation is provided using at least one of the following methods:

Fracturing fluid is injected with proppant and the filler which will degrade over time, thus forming cavities/channels.

After injecting fracturing fluid with proppant, a low-viscosity fluid is injected. The low-viscosity fluid penetrates to high-viscosity fluid, dividing the proppant into separate clusters and forming channels; in such a case the proportion of viscosities of fracturing fluid and the low-visocity fluid is 1:10-1:1,000.

Channels are formed in the proppant pack in place by changing the form of fibers (bending/unfolding) added to the proppant at the injection phase.

Possible examples of channels forming are disclosed in the patent documents RU 2404359 or U.S. Pat. No. 8,061,424 (B2) "Method for hydraulic fracturing of subterranean formation (variants)" and U.S. Pat. No. 7,581,590 (B2) or U.S. Pat. No. 8,066,068 (B2) "Heterogeneous proppant placement in a fracture with removable channelant filler".

For production wells and testing flow-back wells (return of fluid injected during hydraulic fracturing), reduction of fluid velocity is provided by artificial limitation of production flow rate or flow back due to partial closure of production (flowback) flowpath at the surface, that is, using a choke valve 113 as shown in FIG. 1. Such flow reduction can be based on the following ratio: the product of fluid flow rate (V) of produced or flow back fluid (l/sec) by the viscosity ($\mu$) of produced or flow back fluid (Pa*s) is less than 0.003 Pa*l (e.g., does not exceed 0.002 Pa*l).

Another method of production or flow back rate reduction is to increase the fracture area occupied by tail-in portion of fracturing fluid with proppant. This tail-in zone has no channels (to do so, the length of tail-in portion injection is increased).

The proposed method can also be used for injection of worked out drilling mud and cuttings into fractures where fields are developed by well systems; moreover, it allows injecting industrial liquid wastes to formations for disposal. In such cases, injection flow rate is reduced during injection so that the product of injection flow rate (V) (l/sec) by the viscosity ($\mu$) of injected fluid (Pa*s) does not exceed 0.003 Pa*l, e.g. does not exceed 0.002 Pa*l. It is also possible to reduce the viscosity of injected fluid down to 0.0003-0.001 Pa*s, or to increase the temperature of injected fluid on the surface up to 20-100° C.

In particular, the proposed method allows injecting carbon dioxide into formation for CO2 sequestration. If this method is used for such fluids disposal, return of injected fluid back to the surface is prevented upon completion of fluid injection into formation, in order to ensure the injected fluid burial in the formation. Such prevention of fluid return can be provided by the wellhead sealing, or by injecting a matrix-setting fluidinto formation.

Although the above description relates to the methods for oil production, this method can also be applied for production and injection of other fluids (liquids and gases).

The embodiments described above shall not be considered as limiting the scope of patent claims of the disclosure. For any person skilled in the art it is obvious that there is a possibility for numerous changes to be made in the method described above, without deviating from the principle of the disclosure declared in the claims.

The invention claimed is:
1. A method of hydraulic fracturing of a formation penetrated by a well having a wellbore and a lifetime, which comprises:
   injecting fracturing fluid without proppant into the wellbore, thereby creating a fracture in the formation,
   injecting fracturing fluid into the wellbore in a pulse mode, the pulse mode providing at least one pulse of injecting fracturing fluid with proppant and at least one pulse of injecting fracturing fluid without proppant,
   wherein, during the at least one pulse of injecting fluid with proppant, the reinforcing and/or consolidation material concentration is increased by 5 to 500 g/L of fracturing fluid,
   increasing the lifetime of the well by reducing a fluid impact on proppant clusters, wherein the impact is reduced by ensuring that a mathematical product of a fluid flow rate (V)(l/sec) and a viscosity ($\mu$) of fracturing fluid (Pa*s) does not exceed 0.003 Pa*l during the hydraulic fracturing process and injection stages.

2. The method of claim 1, wherein the proppant concentration is increased up to 200-1,800 gram/liter of fracturing fluid.

3. The method of claim 1, wherein the reinforcing and/or consolidation material is organic and inorganic fibers.

4. The method of claim 1, wherein a deformable filler is added to the pulses of injecting fracturing fluid with proppant.

5. The method of claim 4, wherein particles of resin, rubber, nutshells, or combinations thereof are used as the deformable filler.

6. The method of claim 5, wherein a linear dimension of the deformable filler particles is 20 μm-1,000 μm.

7. The method of claim 1, wherein proppant with coating is used during the pulse of injecting fracturing fluid with proppant.

8. The method of claim 1, wherein a fiber concentration in the pulse of injecting fracturing fluid without proppant is increased.

9. The method of claim 1, wherein a ratio of a duration of the pulses of injecting fracturing fluid containing proppant, to a duration of the pulses of injecting fracturing fluid without proppant, is increased in favor of the pulse of injecting fracturing fluid without proppant.

10. The method of claim 1, wherein a viscosity of the fracturing fluid is reduced by reducing a polymer concentration in the fracturing fluid to 0.1-3 g/l or by increasing a fracturing fluid temperature at a surface location to 20-100° C.

11. The method of claim 1, wherein, during the pulse mode of injecting fracturing fluid with proppant, degradable and/or dissolving filler is additionally injected to form channels in a proppant pack.

12. A method of hydraulic fracturing of a formation penetrated by a well having a wellbore and a lifetime, which comprises:

injecting fracturing fluid without proppant into the wellbore, thereby creating a fracture in the formation, injecting fracturing fluid in the wellbore in a pulse mode, the pulse mode providing at least one pulse of injecting fracturing fluid with proppant and at least one pulse of injecting fracturing fluid without proppant, injecting a tail-in stage during which the proppant concentration is increased by 200-1,800 g/L of fracturing fluid, increasing the lifetime of the well by reducing a fluid impact on proppant clusters, wherein the impact is reduced by ensuring that a mathematical product of a fluid flow rate (V)(l/sec) and a viscosity ($\mu$) of fracturing fluid (Pa*s) does not exceed 0.003 Pa*l during the hydraulic fracturing process and injection stages.

13. The method of claim 12, wherein a volume of the tail-in portion of the fracturing fluid containing proppant is between 5,000 and 50,000 l.

14. The method of claim 12, wherein the proppant particles have an asymmetric ratio of width to thickness or length of at least 1:2.

15. The method of claim 14, wherein the proppant has a form of rod-shaped particles.

\* \* \* \* \*